(12) United States Patent
Uesono

(10) Patent No.: US 6,462,965 B1
(45) Date of Patent: Oct. 8, 2002

(54) SWITCHING POWER SUPPLY

(75) Inventor: Nobutaka Uesono, Nagaoka (JP)

(73) Assignee: Densei-Lambda Kabushiki Kaisha (JP)

( * ) Notice: Subject to any disclaimer, the term of this patent is extended or adjusted under 35 U.S.C. 154(b) by 0 days.

(21) Appl. No.: 09/977,763

(22) Filed: Oct. 15, 2001

(51) Int. Cl.$^7$ ............................................ H02M 3/335
(52) U.S. Cl. ........................................ 363/21.14; 70/71
(58) Field of Search ........................... 363/21.14, 21.16, 363/21.17, 69, 70, 71

(56) References Cited

U.S. PATENT DOCUMENTS

| | | | |
|---|---|---|---|
| 4,945,465 A | * 7/1990 | Marinus et al. | 323/267 |
| 5,828,558 A | * 10/1998 | Korcharz et al. | 363/20 |
| 6,011,703 A | * 1/2000 | Boylan et al. | 363/127 |
| 6,049,471 A | * 4/2000 | Korcharz et al. | 363/20 |
| 6,075,352 A | * 6/2000 | Kates et al. | 323/266 |

FOREIGN PATENT DOCUMENTS

| | | |
|---|---|---|
| JP | 7-75336 | 3/1995 |
| JP | 7-115766 | 5/1995 |
| JP | 2976180 | 7/1997 |

* cited by examiner

*Primary Examiner*—Shawn Riley
(74) *Attorney, Agent, or Firm*—Akerman Senterfitt

(57) ABSTRACT

A switching power supply which includes a sychronous rectifier circuit that performs sychronous rectification with a main switching element by using rectifying switching elements. When a current begins to flow into the rectifying switching element 6, the rectifying switching element 6 builds up rapidly by the voltage induced in the auxiliary winding 21 of low impedance. Accordingly, the rectifying switching element 6 turns on rapidly at a point showing an approximately maximum current so that the ON-state resistance of the rectifying switching element 6 can be smaller. The voltage induced in the auxiliary winding 21 is fed directly as a drive signal of the rectifying switching element 6 so that the drive signal is not influenced by an output voltage.

18 Claims, 14 Drawing Sheets gate·source voltage in
main switching element 4 collector voltage in
transistor 27 voltage developed
across resistor 14 gate·source voltage in
rectifying switching
element 6 emitter voltage in
transisror 28 gate·source voltage in rectifying switching element 6 voltage developed
across resistor 14
or resistor 62

SWITCHING POWER SUPPLY

BACKGROUND OF THE INVENTION

1. Field of the invention

The present invention relates a switching regulator, especially a switching regulator which comprises a synchronous rectifier circuit that performs synchronous rectification with a main switching element by using rectifying switching elements as rectifier elements.

2. Description of the Related Art

In this type of switching regulators, relatively large loss is normally caused by the forward voltage of rectifier diodes if such rectifier diodes are used in a rectifier circuit for rectifying a voltage induced in a secondary winding of a transformer. As one representative of prior art for overcoming such drawback, a synchronous rectifier circuit is known in which rectifying switching elements such as Field Effect Transistors (MOS FET), for example, are used as a substitute for the rectifier diodes.

In Japanese un-examined patent publication number 7-115766, for example, is disclosed a flyback type switching regulator, using a certain synchronous rectifier circuit in which when the turn-off of a main switching element is followed by the current flowing through a current transformer via a body diode of a rectifying switching element that comprises MO-SFETs, a voltage is generated according to the current flowing through a resistor connected to a secondary winding of the current transformer, and thus an output of a comparator comparing the voltage with a reference voltage becomes "H"(High) level so that the rectifying switching element turns on through a drive circuit; and thereafter, energy stored in the transformer is transferred to an output side and the current flowing through the rectifying switching element becomes zero so that the output of the comparator becomes "L"(Low) level and the rectifying switching element is made to turn off. In this case, when the current ceases to flow through the rectifying switching element, a control signal to turn off the rectifying switching element is given, whereby the polarity of voltage across an auxiliary winding is reversed so that a signal to make the main switching element turn on is generated.

Also in Japanese registered patent publication number 2976180 is disclosed a synchronous rectifier circuit wherein a current flowing through a rectifying switching element is detected by a current transformer so that the rectifying switching element may be turned on or off. More specifically, the synchronous rectifier circuit is a circuit where a primary winding of a current transformer is connected in series to a parallel circuit of diode and MOS FET that is a rectifying switching element; a resistor is connected in parallel to the secondary winding of the current transformer; and a buffer amplifier lowering an output impedance of the current transformer is connected to a path between the resistor and the gate of the MOS-FET, whereby when the exciting energy of the transformer that comprises a flyback converter finishes discharging the energy as an electrical energy, the polarity of the output signal of the current transformer is reversed and the rectifying switching element is turned off; and thus, a reverse current is prevented from flowing when an output current becomes so small that a period of the current interruption is produced, so that the regulator efficiency is improved.

As is apparent from the foregoing, the above-mentioned synchronous rectifier circuit is one where the rectifying switching element is not only turned on synchronously with the main switching element but also is forcedly turned off in order to block the reverse current flowing through the rectifying switching element.

In the above-mentioned conventional circuits, however, higher efficiency cannot be attained as the rectifying switching element is turned on after detecting the current flowing through the current transformer and thus the rise time is too slow. Further, whilst the above-mentioned registered patent publication number 2976180 teaches that an output voltage is applied to the gate of the MOS-FET via transistors that construct a part of a buffer amplifier when a current flows through the current transformer, it is not possible to drive the rectifying switching element by lower output voltages such as DC 2 V and 3.3 V when such lower output voltages are strongly requested recently.

Also, in the case of a switching regulator in which component regulators including such synchronous rectifier circuit perform a parallel running, the unbalance in the output currents between the component regulators has a serious effect on the regulator as a whole. That is: as a MOS-FET serving as a rectifying switching element has a characteristic that a current is permitted to flow bidirectionally between a drain and a source (bidirectional conductibility), the other circuitry elements in the regulator are likely to be damaged by the reverse current flowing through the rectifying switching element from other component regulators while the rectifying switching element is on.

With regard to the problem, in the Japanese un-examined patent publication number 7-75336 is proposed a regulator wherein even though a higher voltage than an output voltage of a certain regulator itself is applied from output terminals of other regulators, a main switching element is switched by on-pulse of minimum width in each cycle, thus preventing the continuous flow of direct current over two cycles in the rectifying switching element. In this case, however, there must be provided an additional function to keep the main switching element "on" by on-pulse of a minimum width under any condition, thus leading to likelihood that the circuit topology becomes too complicated.

SUMMARY OF THE INVENTION

To eliminate the above-mentioned problem, it is, therefore, an object of the present invention to provide a switching power supply that can operate by lower voltage, while preventing a reverse current from flowing.

It is another object of the present invention to provide a switching power supply with a simple circuit topology that can prevent harmful effects caused by the reverse currents flowing from other component regulators in a parallel running.

According to a first aspect of the present invention, a switching power supply has a rectifying switching element used as a rectifier element that is connected to a secondary winding of a transformer, and includes a synchronous rectifier circuit. The switching power supply also includes a current transformer for detecting a current flowing through the rectifying switching element, with an auxiliary winding wound in the transformer. A drive circuit is included for feeding a voltage generated in the auxiliary winding to the rectifying switching element as an "on" signal. A turn-off circuit is also included for turning off the rectifying switching element before the current flowing through the rectifying switching element reverses, following a detection signal generated in a secondary winding of the current transformer.

When a current starts flowing through the rectifying switching element, the rectifying switching element is built up abruptly by the voltage that is induced. The current is not induced in the current transformer due to it having a high impedance but in the auxiliary winding which has a low impedance, so that the rectifying switching element turns on immediately when the current approaches close to a maximum value. Consequently, the resistance of the rectifying switching element in an "on" state can be reduced as compared with that in the conventional drive circuit by a current transformer so that not only the rectifying switching element but also the power supply itself can have improved efficiency.

Further, as the voltage induced in the auxiliary winding is fed directly to the rectifying switching element as a drive signal, voltage sufficient to turn on the rectifying switching element can be fed merely by suitably changing the number of turns of the auxiliary winding without being influenced by the output voltage so that the needs for a lower output voltage in power supplies can be met. Besides, the rectifying switching element turns off before the current flowing therethrough is reversed, thus ensuring the prevention of the reverse current flowing.

According to a second aspect of the present invention, the switching power supply includes a unidirectionally conductible element which interrupts an output of a signal from the turn-off circuit to the drive circuit when the rectifying switching element is on, while the unidirectionally conductible element conducts to turn off the switching element when a detection signal induced in the secondary winding of said current transformer drops.

Thus, the voltage induced in the auxiliary winding is fed to the switching element as an "on" signal without influencing the drive circuit of the switching element. As the rectifying switching element turns off when the detection signal generated in the secondary winding of the current transformer is lowered, further stabilization of the on/off control can be simply attained by simply installing an unidirectionally conductible element.

According to a third aspect of the present invention, the switching power supply includes an emitter-follower which is provided in the drive circuit of the rectifying switching element and which is connected to a path between the auxiliary winding and the rectifying switching element.

In this case, as the emitter-follower circuit acts as a circuit matching the impedance of the auxiliary winding to that of the rectifying switching element, the rectifying switching element is built up more rapidly than that in conventional switching power supply so that the efficiency is further improved According to a fourth aspect of the present invention, the switching power supply includes a thyristor circuit which is provided in the drive circuit of the rectifying switching element and which is connected to a path between the auxiliary winding and the rectifying switching element.

In this case, once a voltage induced in the auxiliary winding is fed to the gate of the rectifying switching element as a driving voltage, the gate voltage of the rectifying switching element is kept as it is so that it takes an approximately rectangular waveform. Accordingly, the ON-state resistance of the rectifying switching element is kept smaller even after it is turned on so that the efficiency can be improved further.

According to a fifth aspect of the present invention, the switching power supply includes a differential circuit which is provided in the turn-off circuit of the rectifying switching element and which is connected across the secondary winding of the current transformer.

In this case, positive and negative trigger signals are generated from the differential circuit, corresponding to the rise and fall of current generated in the secondary winding of the current transformer. Accordingly, the rectifying switching element is turned off in the case that a negative trigger signal is generated so that on/off operation in the rectifying switching element can be stabilized further.

According to a sixth aspect of the invention, the switching power includes a switching means which is provided in the drive circuit and which turns on when the level of detection signal generated in the secondary winding of the current transformer drops, and then discharges electric charge, stored in the gate of the rectifying switching element, to an output side.

In this case, the electric charge, stored in the gate of the rectifying switching element, can be discharged to an output side via switching means when the rectifying switching elements turns off.

According to a seventh aspect of the invention, the switching power supply includes a speed-up circuit is provided in the turn-off circuit of the rectifying element and which is composed of a parallel circuit of a resistor and a capacitor connected to a path between the secondary winding of the current transformer and the switching means.

In this case, the electric charge in the gate of the rectifying switching element can be rapidly discharged to an output side by speeding up the switching action in the switching means owing to the speed-up circuit.

According to an eighth aspect of the invention, the switching power supply includes a plurality of switching component power supplies performing a parallel running, each component power supply being provided with the synchronous rectifier circuit.

Accordingly, when a rectifying switching element in one component power supply, for examples, turns on in a parallel running where output current is fed to a common load from a plurality of component power supplies, the reverse currents from other component power supplies might be allowed to flow into the component power supply via the rectifying switching element of the component power supply, and yet, such reverse currents are detected by the turn-off circuit of the rectifying switching element. Thus, the reverse currents from other component power supplies can be prevented from flowing into the component power supply so that harmful influence on other circuit elements of the component power supply can be avoided, with the foregoing simple structure of the current transformer and the turn-off circuit.

According to ninth aspect of the invention, the turn-off circuit of the switching power supply is so composed that the rectifying switching element may be turned off when a forward current flowing through the rectifying switching element drops to a predetermined level or below.

Accordingly, not only reverse currents from other component power supplies can be prevented from flowing into the component power supply but also the off-timing of the rectifying switching element is determined by the common turn-off circuit thereof. Thus, the circuit topology does not need to be complicated.

According to a tenth aspect of the invention, a switching power supply has a main switching element, a choke coil for charging or discharging energy, corresponding to on or off of the main switching element and a rectifying switching element which turns on when the choke coil discharges energy. The switching power supply includes a synchronous rectifier circuit which is composed of a drive winding wound in the choke coil, a current transformer for detecting a current flowing through the rectifying switching element, a drive circuit which feeds a voltage induced in the drive winding to the rectifying switching element as an "on" signal, and a turn-off circuit which turns off the rectifying switching element by a detection signal induced in the secondary winding of the current transformer.

Thus, when the main switching element turns from "on" to "off", a voltage is induced in the drive winding by the energy stored in the choke coil until that time point. Then, this voltage is fed from the drive circuit to the rectifying switching element so that the rectifying switching element turns on. On the other hand, when an inertial current flowing through the rectifying switching element, along with the discharge of energy from the choke coil, is detected by the current transformer, and the detection signal induced in the secondary winding of the current transformer drops down to a certain level or below, then the rectifying switching element turns off. By clearly determining the on-off timing of the rectifying switching element this way, a useless power loss due to a reverse current from a light load, for example, allowing energy to be stored in the choke coil and then the energy returning back to a power source, can be avoided.

In addition, by simply winding the drive winding in an existing choke coil, the voltage induced in the drive winding can be directly utilized as the drive signal for driving the rectifying switching element. Also, by simply changing the number of turns of the drive winding in a suitable manner, a voltage sufficient to turn on the rectifying switching element can be fed, so that needs for lower output voltage in power supply can be met through such slight modifications in design.

BRIEF DESCRIPTION OF THE DRAWING

Other objects, features and advantages of the invention will be apparent to those skilled in the art from the following description of the preferred embodiments of the invention, wherein reference is made to the accompanying drawings, of which.

DESCRIPTION OF PREFERRED EMBODIMENT

Hereunder is a description of respective embodiments of a switching regulator of the present invention with reference to the appended drawings.

Figure 1:
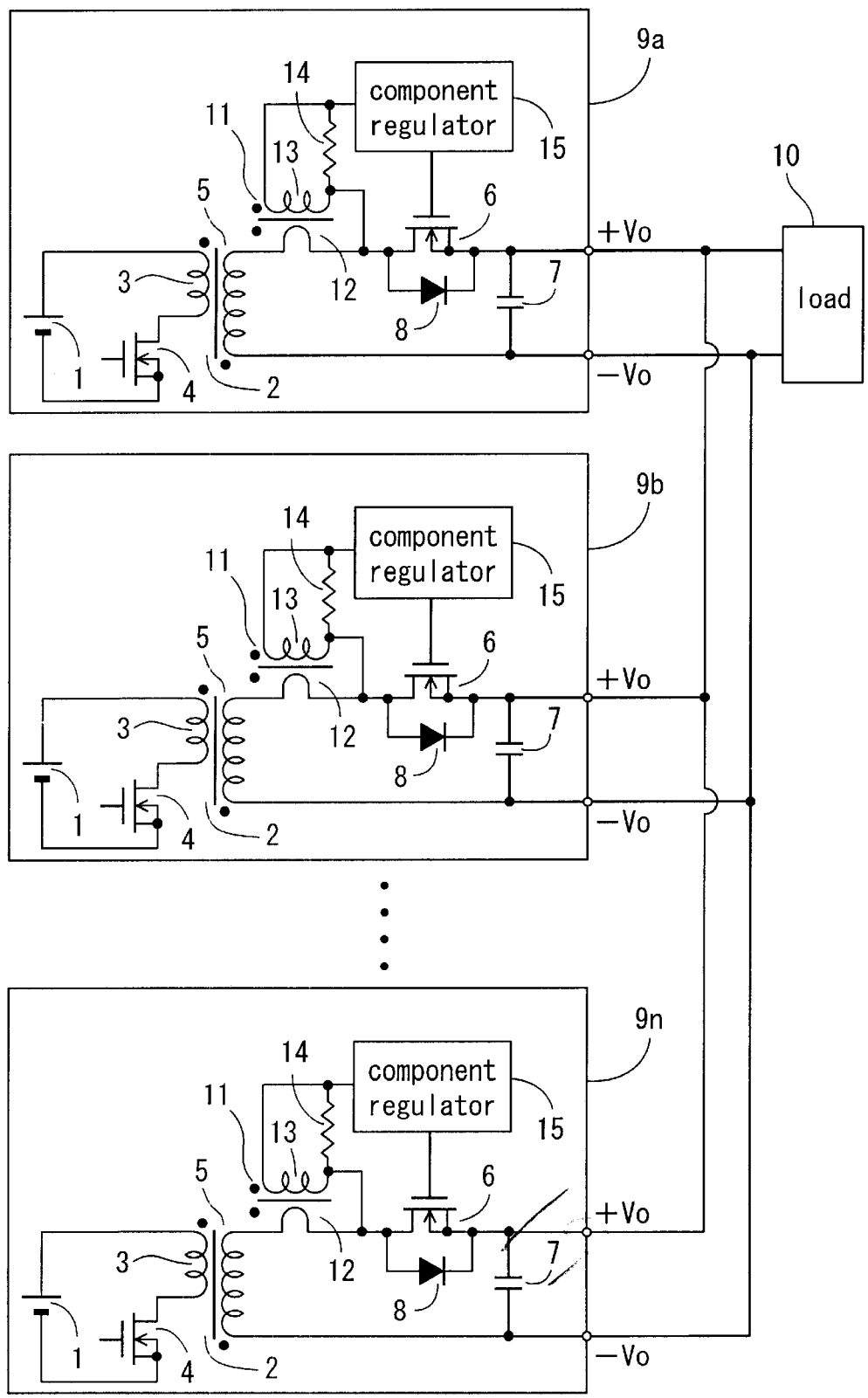
FIG. 1 is a schematic of entire circuit topology of a regulator illustrating a first embodiment of the present invention.
Figure 2:
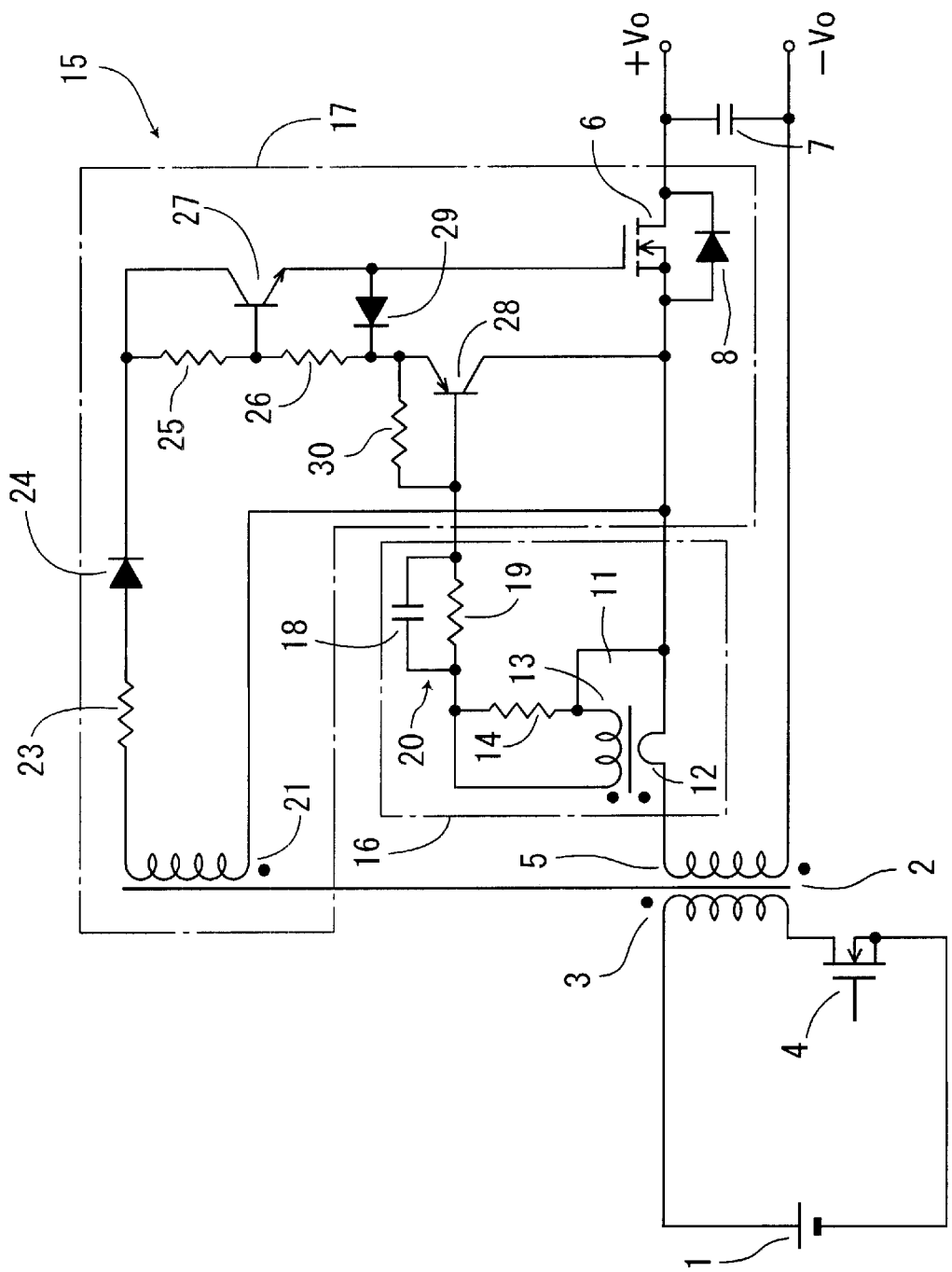
FIG. 2 is a schematic of a respective component regulator illustrating the first embodiment of the present invention.
Figure 3:
FIGS. 3(a) to 3(e) are diagrams of waveforms at respective parts illustrating the first embodiment of the present invention.
Figure 3:
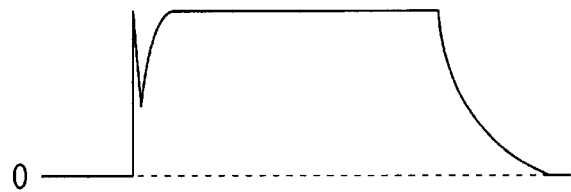
Figure 3:
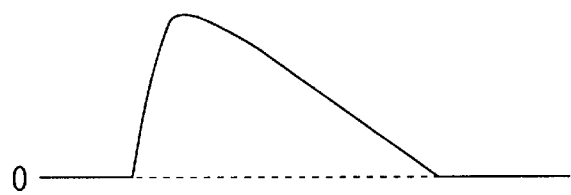
Figure 3:
Figure 3:
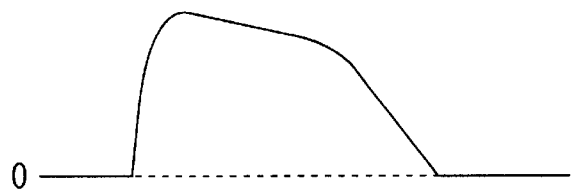

FIG. 1 to FIG. 3 are schematics showing a first embodiment of the present invention. In FIG. 1 showing an entire topology of a regulator of the invention, reference numeral 1 denotes a direct current source for feeding DC input voltage, while reference numeral 2 denotes a main transformer in which a primary side is isolated from a secondary side. A series circuit of a primary winding 3 of the transformer 2 and a main switching element 4 such as MOS FET, for example, is connected across both terminals of the direct current source 1. A rectifying switching element 6 such as MOS FET, for example, is connected to a secondary winding 5 of the transformer 2, said element 6 serving as a rectifier element forming a synchronous rectifier circuit. Further, a rectifier smoothing circuit in the secondary of the transformer 2 is constructed by this rectifying switching element 6 and a smoothing capacitor 7. In the meantime, reference numeral 8 denotes a body diode built in the rectifying switching element 6, while +VO, -VO, are output terminals connected to both terminals of the smoothing capacitor 7.

In the present embodiment, respective component regulators 9a, 9b . . . . 9n have a topology of so-called flyback type DC/DC converter where an input voltage from the direct current source 1 is applied to the primary winding of the transformer 2 when the main switching element 4 turns on so that energy is stored in the transformer 2, while if the main switching element 4 turns off, the energy stored in the transformer 2 is transmitted to a load 10 connected to the smoothing capacitor 7 and the output terminals +VO, -VO, via the rectifying switching element 6 or a body diode 8. In the meantime, any of the respective regulators 9a, 9b . . . 9n comprises an identical inner topology.

Reference numeral 11 denotes a current transformer serving as a detecting device for detecting the current flowing through the rectifying switching element 6 or the body diode 8. The primary winding 12 of the current transformer 11 is connected to a path between the secondary winding 5 of the transformer 2 and the rectifying switching element 6, while a resistor 14 is connected to the both terminals of the secondary winding 13. Reference numeral 15 denotes a control part of the rectifying switching element which controls on-off operation of the rectifying switching element 6. Thus, the rectifying switching element 6 performs on-off operation synchronously with the main switching element 4 by a drive signal from the control part 15 of the rectifying switching element.

In the embodiment, a parallel running is performed with the output terminals of said respective component regulators 9a, 9b, . . . , 9n being connected to the common load 10. In this case, certain preset output currents Ioa, Iob, . . . , Ion are fed to the load 10 from the respective component regulators 9a, 9b, . . . , 9n. Needless to say, an individual running also is possible by a single regulator (e.g., by the regulator 9a).

Next, the topology of component respective regulators 9a, 9b, . . . , 9n is described in detail with reference to FIG. 2. In the drawing, said control part 15 of the rectifying switching element 6 comprises: a turn-off circuit 16 which turns off the rectifying switching element 6 by a detection signal generated in the secondary winding 13 of current transformer 11; and a drive circuit 17 which feeds the voltage generated in a hereinafter-described auxiliary winding 21 to said rectifying switching element as an "on" signal. The said turn-off circuit 16 is structured, in addition to the aforesaid current transformer 11 and the resistor 14, such that one terminal of the aforesaid resistor 14 is connected to one terminal of a speed-up circuit 20 which comprises a parallel circuit of a capacitor 18 and a resistor 19, while the other terminal of the resistor 14 is connected to a line from the primary winding 12 of the current transformer 11 to the rectifying switching element 6.

Said transformer 2 comprises an independent auxiliary winding 21 besides the primary winding 3 and the secondary winding 5 thereof. The drive circuit 17 for feeding a voltage induced in the auxiliary winding 21 to said rectifying switching element 6 as "on" signal is arranged at the path from the auxiliary winding 21 to the gate of the rectifying switching element 6. The drive circuit 17 is one where one terminal (an undotted side terminal) of the auxiliary winding 21 is connected to a series circuit of a resistor 23 and a diode 24, while an emitter-follower circuit serving as an impedance matching circuit comprising resistors 25, 26 and NPN type transistor 27, is connected to the cathode of the diode 24, and the emitter of the transistor 27 is connected to the gate of the rectifying switching element 6. The other terminal of the resistor 26 of which one terminal is connected to the base of the transistor 27 is connected to the emitter of a PNP type transistor 28. A resistor 30 is connected to a path between the emitter and the base of the transistor 28 while a diode 29 for discharge purpose is connected to the path between the emitter of the transistor 28 and the gate of the rectifying switching element 6. The base of the transistor 28 is connected to the other terminal of said speed-up circuit 20, while the collector of the transistor 28 and the other terminal (the dotted side terminal) of said auxiliary winding 21 are connected to the path from the primary winding 12 of the current transformer 11 to the source of the rectifying switching element 6.

Next, the action of the above-mentioned topology is described with reference to FIG. 3, as a diagram of waveforms. FIG. 3 shows respective waveforms in respective parts of the component regulator 9a under the condition that no reverse current flows thereinto from ot regulators 9b to 9n. A waveform (a) shown in the uppermost part shows a voltage between the gate and source of the main switching element 4, while a next waveform (b) shows a voltage generated in the collector of transistor 27 relative to a reference line from the primary winding 12 of the current transformer 11 to the rectifying switching element 6. A waveform (c) shows a voltage developed across the resistor 14, while a waveform (d) shows a voltage between the gate and source of the rectifying switching element 6, and a waveform (e) shows a voltage in the emitter of transistor 28 relative to the reference line from the primary winding 12 of the current transformer 11 to the rectifying switching element 6.

Under the condition that no reverse current flows in, as shown in FIG. 3, a certain preset voltage is applied to between the gate and source of the main switching element 4, and thus if the main switching element 4 turns on, an input voltage is applied to the primary winding 3 of the transformer 2 so that a positive voltage is induced at the dotted side terminals of the secondary winding 5 and the auxiliary winding 21. In this case, however, as the diode 24 turns off, the rectifying switching element 6 turns off. As the diode 8 is off, no current flows through the secondary winding 5 of the transformer 2 nor through the primary winding 12 of the current transformer 11 so that the transistor 27 turns off and the transistor 28 turns on. After all, only exiting current flows in the primary winding 3 of the transformer 2 so that energy corresponding to the exiting current is stored in the transformer 2 and energy from the smoothing capacitor 7 is supplied as an output current to the load connected to the output terminal +Vo, −Vo.

Thereafter, when the voltage between the gate and source of the main switching element 4 becomes zero and the main switching element 4 turns off, the application of voltage to the primary winding 3 of transformer 2 is interrupted, so that a positive voltage is induced in turn at the non-dotted side terminals of the secondary winding 5 and the auxiliary winding 21. Then the diode 8 turns on and thus energy (output current) is supplied from the secondary winding 5 of the current transformer 2 to the smoothing capacitor 7 and the load 10 via the primary winding 12 of the current transformer 11 and the body diode 8. Also, as the diode 24 connected to the auxiliary winding 21 also turn on, a current flows through the auxiliary winding 21, the resistor 23 and the diode 24

Due to the number of turns in the secondary winding 13 of the current transformer 11 being greater than that of the auxiliary winding 21, and a cross-sectional area of a winding wire thereof being smaller than that of the auxiliary winding 21, the secondary winding 13 of the current transformer 11 has a higher impedance than the auxiliary winding 21. Therefore, a voltage across the auxiliary winding 21 of lower impedance builds up steeply and the diode 24 turns on so that a base potential of the transistor 27 rises and thus the transistor 27 turns on quickly. Accordingly, the voltage induced in the auxiliary winding 21 is quickly transmitted to the gate of the rectifying switching element 6 as a drive signal for the rectifying switching element 6. On the other hand, due to the lower impedance in the base of the transistor 28, the voltage across the resistor 14 builds up more slowly than that across the auxiliary winding 21 so that the base potential of the transistor 28 builds up gradually and thus the transistor 28 finally turns off.

An output current generated from the secondary winding 5 of the transformer 2 reaches a maximum value immediately after the main switching element 4 turns off and thereafter falls slantingly, depending on the inductance of the secondary winding 5. In the embodiment, the voltage induced in the auxiliary winding 21 is fed to the rectifying switching element 6, as a drive signal, as swiftly as possible immediately after the main switching element 4 turns off so that the ON-state resistance of the rectifying switching element 6 is made small and the regulator efficiency can be improved. Also, the reduction of loss by the synchronous rectification can be realized by flowing output current through the smoothing capacitor 7 and the load 10 via the rectifying switching element 6.

Thereafter, a current waveform generated in the secondary winding 13 of the current transformer 11, that is a voltage waveform across the resistor 14, falls slantingly and the base potential of the transistor 28 falls. The transistor 28 serving as a switching means turns on when the voltage across the resistor 14 falls to a certain level. Thus, the potential at the junction points (the base of the transistor 27) of the resistors 25 and 26 falls suddenly and thus the transistor 27 turns off so that the supply of drive signals to the rectifying switching element 6 is interrupted. At this moment, the charge stored in the gate of the rectifying switching element 6 is discharged rapidly to the output side via the diode 29, the transistor 28 and the diode 8. Thus, the timing for interrupting the driving signals to the rectifying switching element 6 is determined by the level of the detection signal, utilizing a slanting fall of the detection signal generated in the secondary winding 13 of the current transformer 11.

On the other hand, in the component regulator 9a, for example, when said rectifying switching element 6 turns on, the reverse current from other regulators 9b to 9n flows into the primary winding 12 of transformer 11 via the source and drain of the rectifying switching element 6 from the output terminal +Vo of the regulator 9a, so that positive voltage is generated at the dotted side terminal across the resistor 14 and thus the transistor 27 turns off immediately to thereby interrupt the supply of the detection signals to the rectifying switching element 6. Therefore, harmful influence on other circuit elements inside the regulator 9a can be avoided, by allowing the rectifying switching element 6 to be turned off and preventing the reverse current from other component regulators 9b to 9n from flowing into the regulator 9a.

According to the present embodiment, the synchronous rectifier circuit of the switching regulator which is connected to the secondary winding 5 of the transformer 2 and utilizes the rectifying switching element 6 as a rectifier element, comprises a current transformer for detecting a current flowing through the rectifying switching element 6, an auxiliary winding 21 wound in the transformer 2, a drive circuit 17 for feeding a voltage induced in the auxiliary winding 21 to the rectifying switching element 6 as an "on" signal and a turn-off circuit 16 which turns off the rectifying switching element 6 before the current flowing through the rectifying switching element 6 is reversed by the detection signal induced in the secondary winding 13 of current transformer 11.

In this case, when the current begins to flow through the rectifying switching element 6 (the body diode 8), the rectifying switching element 6 turns on rapidly by the voltage induced not in the secondary winding 13 of the current transformers of a higher impedance but in the auxiliary winding 21 of a lower impedance, so that the rectifying switching element 6 turns on rapidly when the current becomes nearly maximum. Accordingly, the ON-state resistance of the rectifying switching element 6 can be made smaller than that in a conventional driving method using a current transformer, and thus not only the rectifying switching element 6 but also the regulator can be improved in respect of efficiency. Further, as the voltage induced in the auxiliary winding 21 is fed directly to the rectifying switching element 6 as a driving signal, the voltage sufficient to turn on the rectifying switching element 6 can be fed merely by suitably changing the number of turns of the auxiliary winding 21 without being influenced by an output voltage, whereby needs for lower output voltage in regulators can be satisfactorily met. Moreover, the prevention of the occurrence of a reverse current can be ensured as the rectifying switching element 6 turns off at a certain level before the current flowing through the rectifying switching element 6 turns reverse.

Also, the drive circuit 17 of the rectifying switching element according to the embodiment comprises an emitter-follower circuit which is composed of the resistors 25, 26 and a transistor 27 and is connected to the path between the auxiliary winding 21 and the rectifying switching element 6. In this case, the emitter-follower circuit functions to match the impedance of the auxiliary winding 21 to that of the rectifying switching element 6 so that the rectifying switching element 6 builds up more rapidly than that in prior art and thus the regulator efficiency is improved further.

Moreover, in the embodiment, the drive circuit 17 of the rectifying switching element includes the transistor 28 serving as a switching means which turns on when the level of the detection signal induced in the secondary winding 13 of the current transformer 11 drops, and discharges the charge stored in the gate of the rectifying switching element 6 to the output side.

In this case, when the rectifying switching element 6 turns off, the charge stored in the gate of the rectifying switching element 6 can be discharged to the output side via the transistor 28.

Besides in the embodiment, the turn-off circuit 16 of the rectifying switching element is connected to the speed-up circuit 20 comprising the parallel circuit of the capacitor 18 and the resistor 19, connected to the path between the secondary winding 13 of the current transformer 11 and the transistor 28, so that the speed-up circuit 20 quickens the switching operation of the transistor 28 and the charge stored in the gate of the rectifying switching element 6 can be discharged rapidly to the output side.

Also in the embodiment, the switching regulator, which performs a parallel-running with a plurality of component regulators 9a, 9b, ..., 9n each being equipped with the synchronous rectifier circuit having the rectifying switching element 6, comprises the current transformer 11 for detecting the current flowing through the rectifying switching element 6 and the turn-off circuit 16 which turns off the rectifying switching element 6 when the current transformer 11 detects a reverse current from other component regulators 9b to 9n. That is, the switching regulator comprises a plurality of component regulators 9a, 9b, ..., 9n which are equipped with synchronous rectifier circuits and operate a parallel-running.

Accordingly, in a parallel-running where output current is fed to a load 10 from a plurality of component regulators 9a, 9b ..., 9n, when the rectifying switching element 6 of the component regulator 9a turns on and a reverse current is about to flow into the rectifying switching element 6 of the component regulator 9a from other component regulators 9b to 9n, the reverse current is detected by the current transformer 11 so that the rectifying switching element 6 turns off immediately by the turn-off circuit 16 thereof. Thus, with such a simple topology as including only the current transformer11 and the turn-off circuit 16, the reverse current can be prevented from flowing into the component regulator 9a from other component regulators 9b to 9n and thus harmful influence on other circuit elements in the component regulator 9a can be avoided.

Also, the turn-off circuit 16 of the rectifying switching element in the embodiment has such a function that the rectifying switching element 6 turns off when a forward current flowing through the rectifying switching element 6 drops to a certain level or below, so that not only the reverse current can be prevented from flowing into the component regulator 9a from said other component regulators 9b to 9n but also the off-timing of the rectifying switching element 6 synchronized with the on-off timing of the main switching element 4 can be determined by the common turn-off circuit 16 of the rectifying switching element. Accordingly, the circuit topology does not become so complicated.

Figure 4:
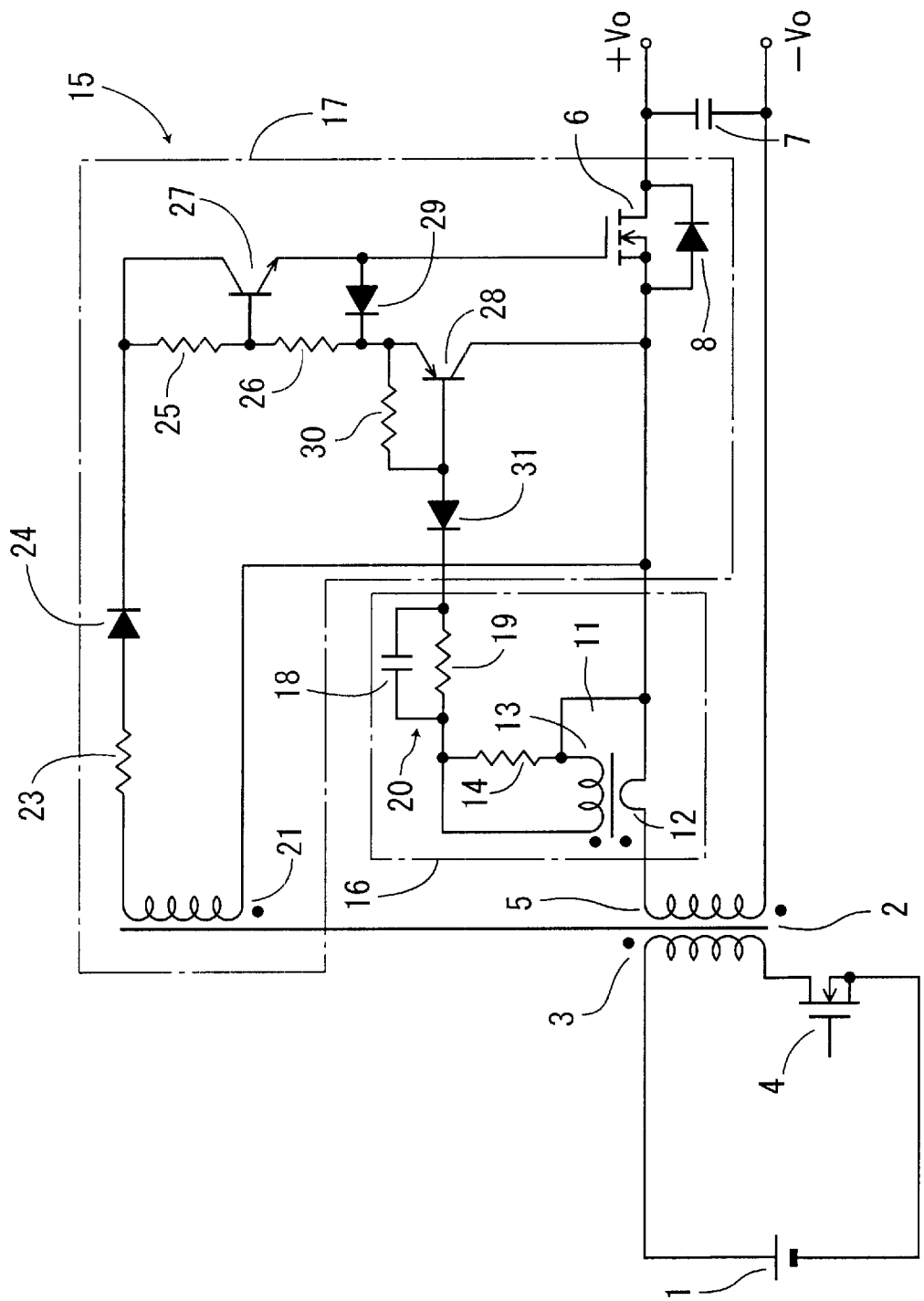
FIG. 4 is a schematic of a regulator according to a second embodiment of the present invention.

In FIG. 4 showing a second embodiment of the invention, the invention is described using the same reference symbols for the same portions as those described in the above-mentioned embodiment In this embodiment, to the path between the drive circuit 17 and the turn-off circuit 16, a diode 31 is connected as an unidirectionally conductive element for separating both circuits. In the meantime, the topology of the other parts than those described above is the same as the first embodiment.

Figure 5:
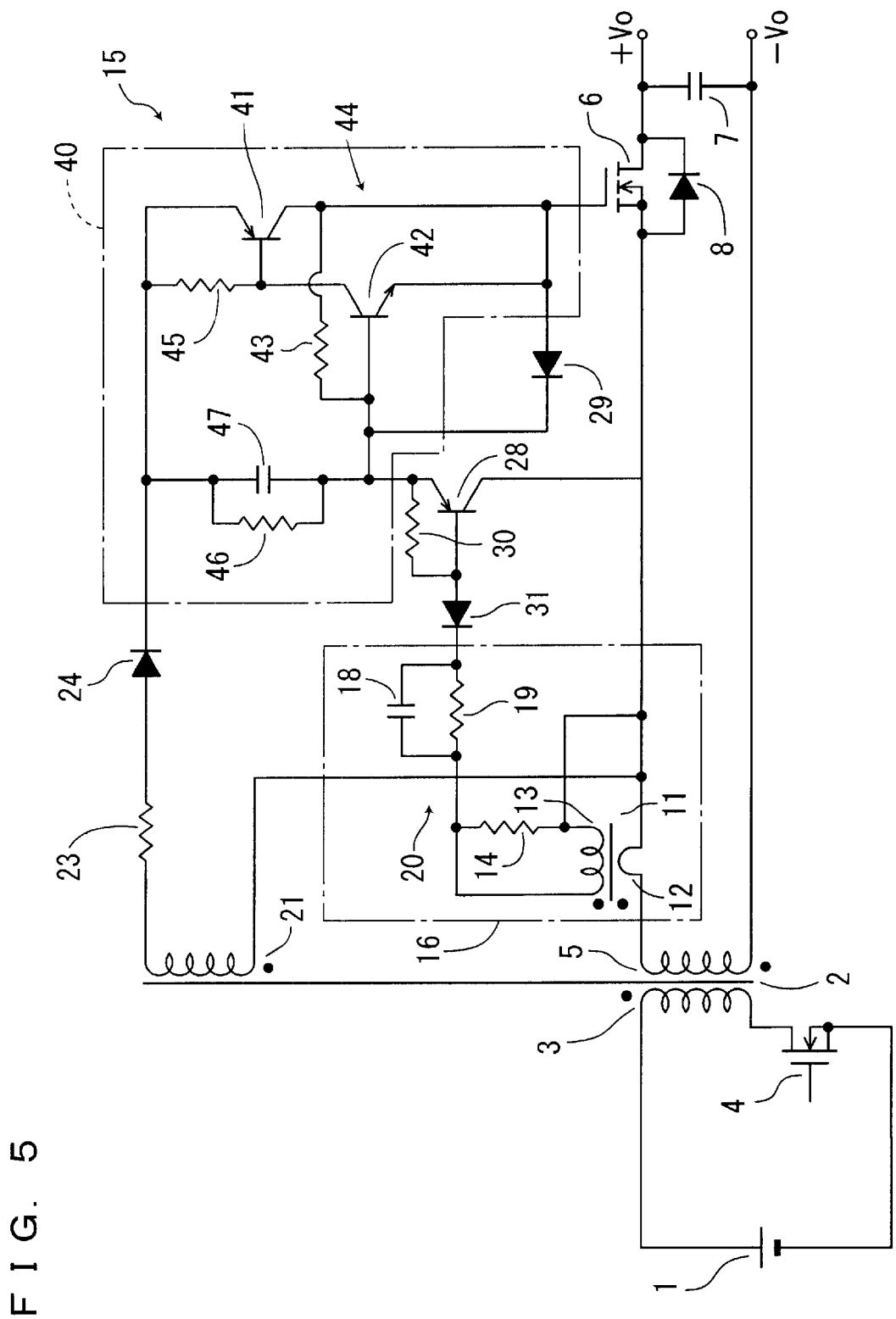
FIG. 5 is a schematic of a regulator according to a third embodiment of the present invention.
Figure 6:
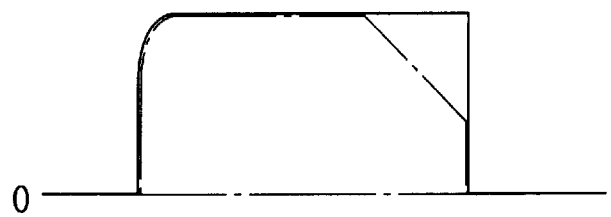
FIG. 6 is a diagram of a waveform at a main part according to the third embodiment of the present invention.

Immediately after a current flows through the secondary winding 13 of the current transformer 11, a voltage generated across the resistor 14 is ineffective to the drive circuit 17 as the voltage generated across the resistor 14 is interrupted by the diode 31, and the transistor 28 turns off while the transistor 27 turns on so that a voltage induced in the auxiliary winding 21 is fed to the gate of the rectifying switching element 6 as a driving signal. Thereafter, when the waveform of the current flowing through the secondary winding 13 of transformer 11 drops slantingly, the voltage across the resistor 14 drops slantingly in the same manner and thus the diode 13 turns on. Accordingly, the transistor 28 turns on while the transistor 27 turns off, and the charge stored in the gate of the rectifying switching element 6 is discharged via the diode 19 and the transistor 28 so that the rectifying switching element 6 turns off. Thus, in the present embodiment, the on/off operation of the rectifying switching element 6 can be stabilized further by simply providing the diode 31 to interrupt the output of signals from the turn-off circuit 16 to the outside, In FIG. 5 and FIG. 6 showing a third embodiment of the present invention, the invention is described using the same reference symbols for the same portions as those described in the foregoing embodiments. In the schematic in FIG. 5 showing a drive circuit of a rectifying switching element of the embodiment, it is noted that a collector of a PNP type transistor 41 is connected to a base of a NPN type transistor 42 via a resistor 43, while as a substitute for the emitter-follower circuit in the first and second embodiment is provided a so-called thyristor (SCR) circuit 44 where the base of the transistor 41 is connected directly to the collector of the transistor 42. Further, a resistor 45 is connected to the path between the base and emitter of the transistor 41, while a junction point of the resistor 45 and the emitter of transistor 41 is connected to the cathode of said diode 24. The collector of the transistor 41 and the emitter of the transistor 42 are connected to the gate of said rectifying switching element 6, while said diode 29 for discharge purpose is connected to the path between the emitter and base of the transistor 42. Further, the base of the transistor 42 is connected to the emitter of the transistor 28, while a parallel circuit of a resistor 46 and a capacitor 47 is connected to the path between the emitter of the transistor 28 and the cathode of the diode 24. The topology of the other parts than those described above is the same as the second embodiment shown in FIG. 4.

In the circuit using the emitter-follower circuit in the first and the second embodiments, a base voltage of the transistor 27 drops with the drop of the voltage across the resistor 14 as shown by the chain lines in FIG. 6 and the voltage across the gate and the source of the rectifying switching element 6 drops slantingly. In the thyristor circuit 44 of the embodiment, however, a voltage is induced in the auxiliary winding 21 and once it is fed to the gate of the rectifying switching element 6 as a driving voltage, then the gate potential of the rectifying switching element 6 is kept intact and becomes an approximately square waveform as shown by solid lines in FIG. 6. Accordingly, a resistance of the rectifying switching element 6 that is on is kept small so that the regulator efficiency can be improved further. It should be noted that the component elements in the thyristor circuit 44 should not be limited to those used in the embodiment.

Figure 7:
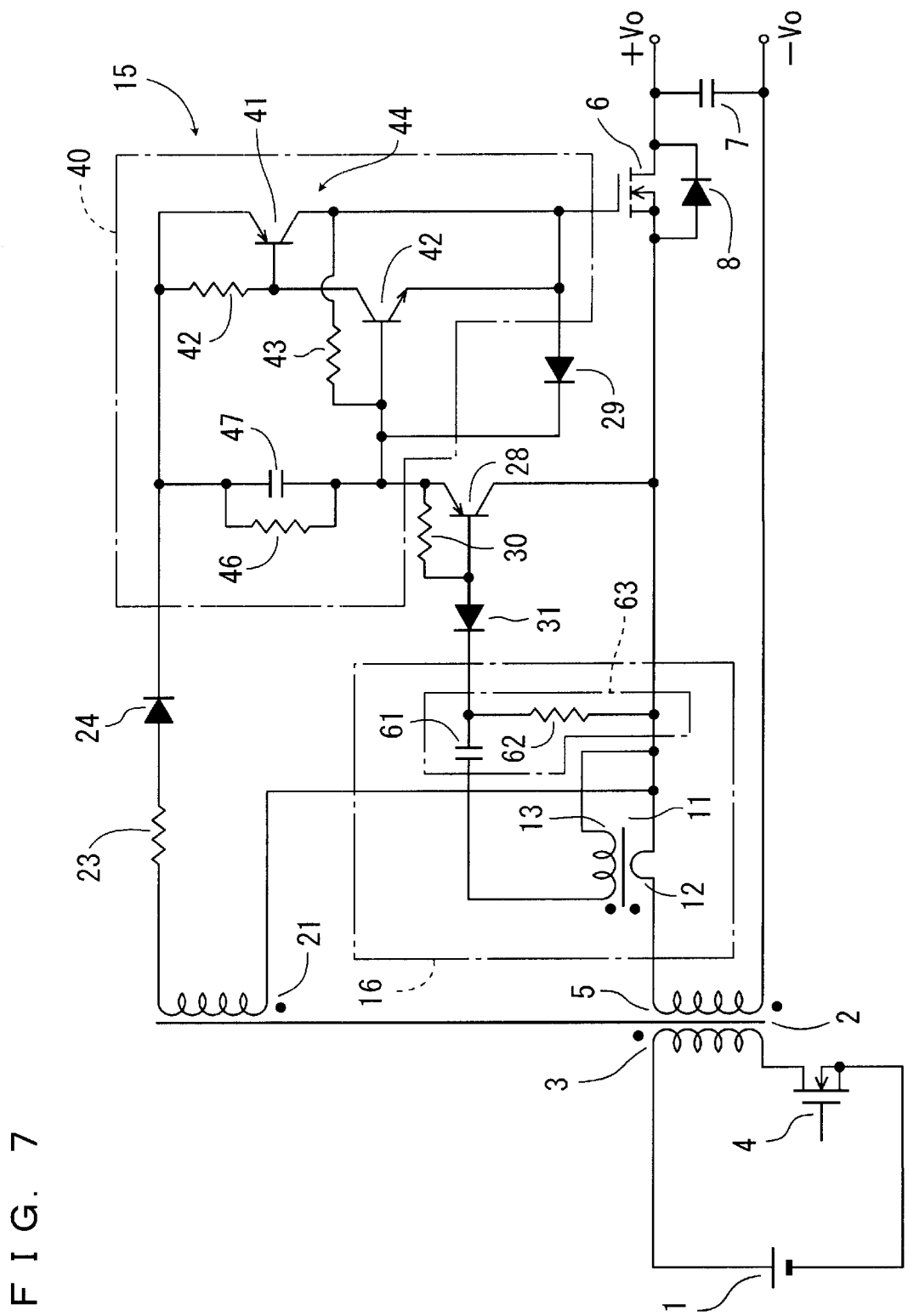
FIG. 7 is a schematic of a regulator according to a fourth embodiment of the present invention.
Figure 8:
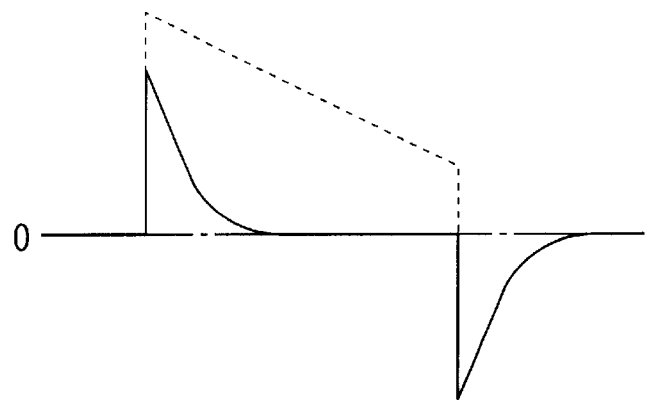
FIG. 8 is a diagram of waveforms at a main part according to the fourth embodiment of the present invention.

A fourth embodiment of the present invention is shown in FIG. 7 and FIG. 8 and is described using the same reference symbols for the same parts as described in the foregoing embodiments. In the schematic in FIG. 7 showing this embodiment, in place of the resistor 14 in said turn-off circuit 16 is provided a differential circuit 63 comprising a capacitor 61 and a resistor 62, which differentiates a detection signal induced in the secondary winding 13 of the current transformer 11, said differential circuit 63 being connected across the secondary winding 13 of the current transformer 11. Likewise, the topology of the other parts than those described above is the same as the foregoing third embodiment.

In the first to the third embodiments, whilst the voltage across the resistor 14 becomes a waveform as shown by broken lines in FIG. 8, positive and negative trigger signals are generated across the resistor 62, corresponding to the building-up and building-down of the current generated in the secondary winding 13 of the current transformer 11, such as the waveform shown by solid lines in FIG. 8 in the present embodiment. Accordingly, with the rectifying switching element 6 so composed as to turn off when the negative trigger is generated, the on-off operation of the rectifying switching element 6 can be stabilized further. It should be noted that the component elements in the differential circuit should not be limited to those described in the embodiment.

Figure 9:
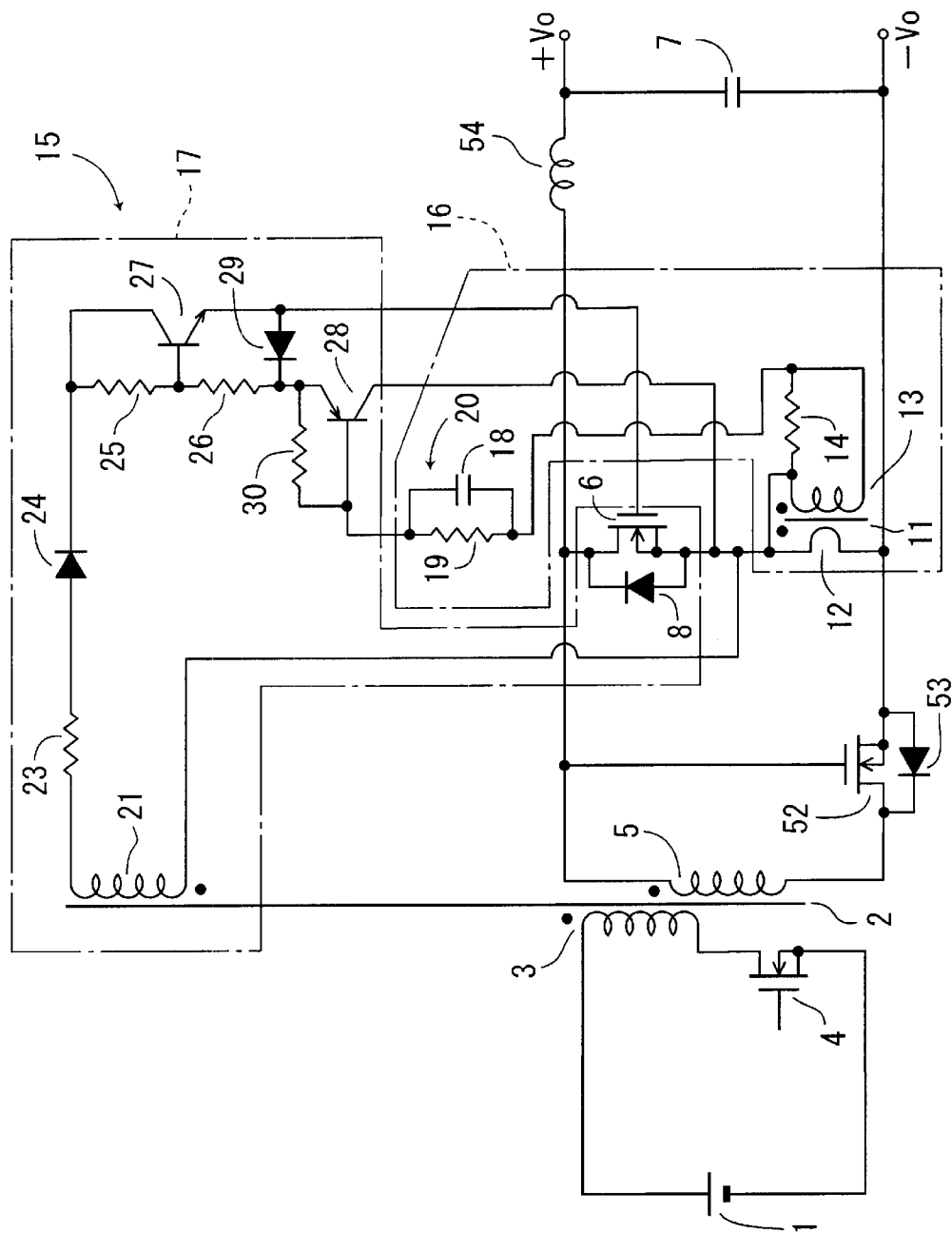
FIG. 9 is a schematic of a regulator according to a fifth embodiment of the present invention

A fifth embodiment of the present invention is shown in FIG. 9 and is described using the same reference symbols for the same parts as those described in the above-mentioned embodiment. The fifth embodiment shows an example where the structure of the invention is applied to a switching regulator comprising a forward type DC/DC converter. More specifically, said rectifying switching element 6 is connected, as a rectifier element to be connected to the secondary winding 5 of the transformer 2, instead of a conventional flywheel diode, while the same drive circuit 17 and the same turn-off circuit 16 as those described in the first embodiment are provided. Of course, the circuit topologies in the second to the fourth embodiment may be provided instead of these circuits.

The primary winding 2 and secondary winding 5 of the transformer 1 are connected with additive polarity unlike in a flyback type. Another rectifying switching element 52, composing a synchronous rectifier circuit together with the rectifying switching element 6, is connected to the other terminal (the non-dotted side terminal) of the secondary winding 5 of the transformer 2. Reference numeral 53 denotes a body diode of the rectifying switching element 52. A series circuit of a choke coil 54 and said smoothing capacitor 7 is connected across both terminals of the rectifying switching element 6, while the output terminals +Vo,−Vo are connected to both terminals of the smoothing capacitor 7.

In this embodiment, when the main switching element 4 turns on and an input voltage is applied to the primary winding 3 of the transformer 2, the rectifying switching element 52 turns on by the positive voltage generated at the dotted side terminal of the secondary winding 5 of the transformer 2 so that energy is transmitted to the common load 10 connected to the smoothing capacitor 7 and the output terminals +Vo, −Vo via the secondary winding 5 of the transformer 2 and the choke coil 54. On the other hand, when the main switching element 4 turns off, the voltage induced in the auxiliary winding 21 is fed to the gate of the rectifying switching element 6 as an "on" signal and thus the rectifying switching element 6 turns on so that the energy stored in the choke coil 54 is supplied to the smoothing capacitor 7 and the load 10 and thus a current flows through the primary winding 12 of the current transformer 11 and the rectifying switching element 6. Thereafter, if the detecting current in the secondary winding 13 of the current transformer 11 drops gradually, the rectifying switching element 6 turns off by the turn-off circuit 16 of the rectifying switching element Further, even though the reverse current from other component regulators 9b to 9n is about to flow into the component regulator 9a via the rectifying switching element 6 of the component regulator 9a when, for example, the rectifying switching element 6 in the component regulator 9a turns on, yet the rectifying switching element 6 turns off immediately by the turn-off circuit 16 as the reverse current is detected by the current transformers. Thus, whilst energy is likely to be once stored in the choke coil 54 due to the reverse current flowing into the component regulator 9a from the other component regulators 9b to 9n, and then to flow into the secondary winding 5 of the transformer 2 when the rectifying switching element 52 turns on, such undesirable flow of the reverse current can be prevented, so that harmful influence on other circuit elements in the component regulator 9a can be avoided.

In this case as well, improved efficiency due to the rapid build-up of the rectifying switching element 6 by the voltage induced in the auxiliary winding 21 can be attained, and the needs for lower output voltage in regulators can also be met. Besides, by the synchronous rectification using the rectifying switching elements 6 and 53, the regulator loss can be made smaller than that of conventional regulators equipped with diode rectifiers. Through the application of the rectifier switching element according to the first to fourth embodiments to circuits of regulators as a substitute of conventional flywheel diode, operation of forward converters can be so stabilized that the rectifying switching element 52 turns on when the main switching element 4 is on, while the rectifying switching element 6 turns on when the main switching element 4 is off.

Although a forward type DC/DC converter is specifically described in the fifth embodiment, the invention is applicable to any type of switching regulators with a flywheel diode.

Figure 10:
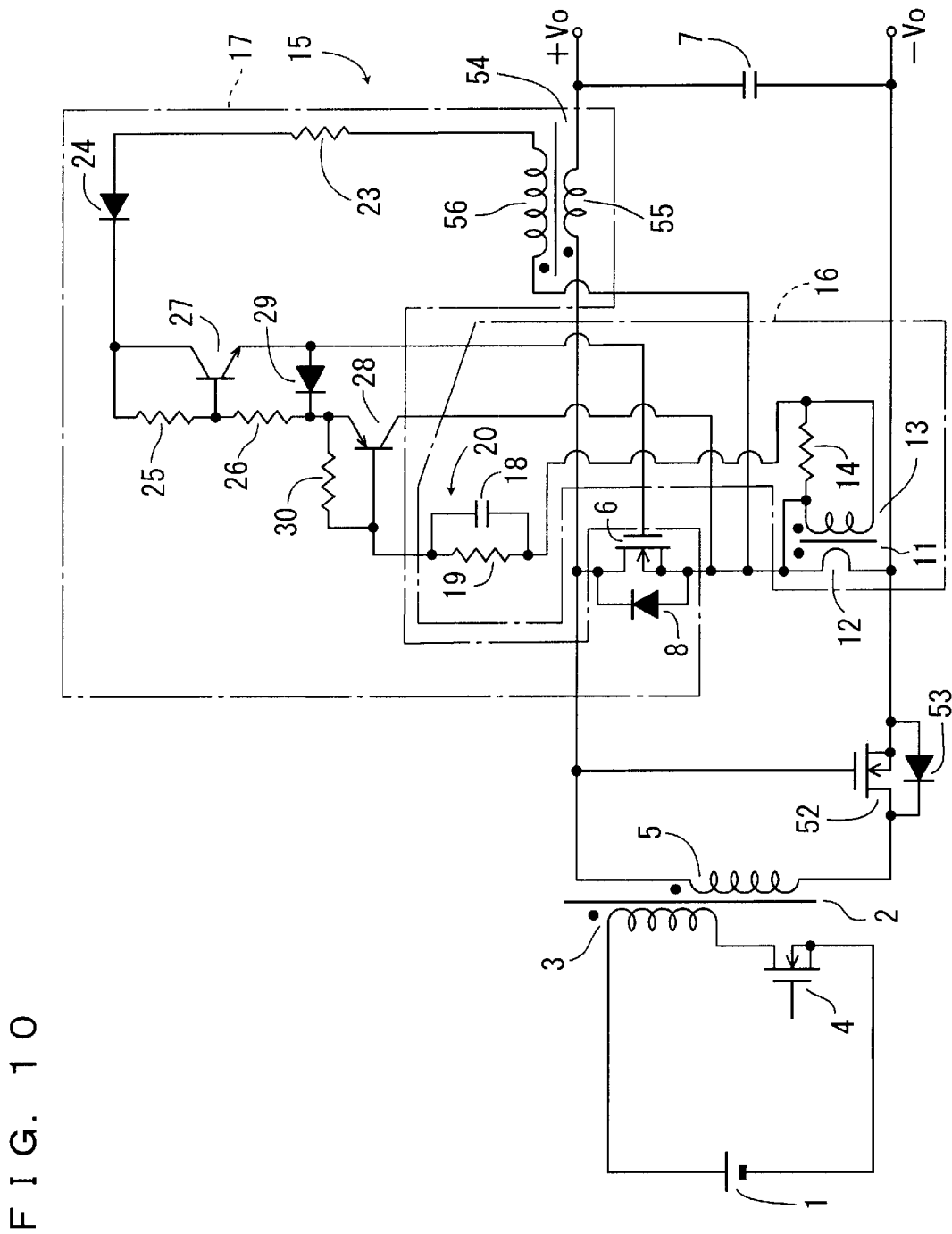
FIG. 10 is a schematic of a regulator according to a sixth embodiment of the present invention.

FIG. 10 shows a sixth embodiment of the present invention, and it is described using the same reference numbers for the same parts as those described in the foregoing embodiments. Here is shown another example where the invention is applied to a switching regulator comprising a forward type DC/DC Converter. More specifically, a driving winding 56 is wound around a core that is common with a main winding 55 of a choke coil 54, instead of the auxiliary winding 21 of the fifth embodiment so that voltage induced in the driving winding 56 is fed to the rectifier switching element 6 as an "on" signal. In the meantime, other topology than the above-mentioned is the same as the fifth embodiment.

According to the above-mentioned composition, when the main switching element 4 turns on and an input voltage is applied across the primary winding 3 of the transformer 2, the rectifier switching element 52 turns on by the positive voltage generated at the terminal dotted side of the secondary winding 5 of the transformer 2 so that energy is transmitted to the smoothing capacitor 7 and the load (not shown in FIG. 10) connected to output terminals +Vo and −Vo via the main winding 55 of the choke coil 54 from the secondary winding 5 of the transformer 2. At this moment, whilst the positive voltage is induced also to the dotted side terminal of the driving winding 56 of the choke coil 54, the rectifier switching element 6 turns off as the diode 24 comprising the drive circuit 17 turns off.

After that, as the applying of the input voltage to the primary winding 3 of the transformer 2 is interrupted when a voltage between Gate and Source of the main switching element 4 turns zero and then the main switching element turns off, the positive voltage is then induced in the non-dotted side of the terminal of the secondary winding 5 so that the rectifier switching element 52 turns off. Further, as a positive induced electromotive force is generated in the non-dotted side of the terminal of the main windings 55 of the choke coil 54 by the energy stored in the choke coil 54 until then, so that a current flows in a path defined by, the choke coil 54, the smoothing capacitor 7 (or the load), the primary winding 12 of the current transformer 11, the body diode 8, the choke coil 54, in sequence, and thus energy is discharged from the choke coil 54 to the smoothing capacitor 7 or to the load. As the positive voltage is induced in the non-dotted side of the terminal of the driving winding 56 of the choke coil 54 and then the diode 24 connected to the driving winding 56 turns on, a current flows to the emitter-follower circuit on the latter part leading from the driving winding 56 through the resistor 23 and the diode 24, and then the base potential of the transistor 27 rises so that the transistor 27 turns on. Thus, the voltage induced in the drive winding 21 is fed to the gate of the rectifier switching element 6 as a signal to drive the rectifier switching element 6.

As the emitter-follower circuit comprising the transistor 27 has the function to match the impedance of the drive winding 21 to that of the rectifying switching element 6, "on" signal supplied to the rectifying switching element 6 rises rapidly. On the other hand, a voltage generated in the resistor 14 builds up more slowly than the driving voltage supplied to the rectifier switching element 6, due to the impedance of the secondary winding 13 of the current transformer 11 being high while the impedance of the base in the transistor 28 being low. Therefore the base potential in the transistor 28 rises gradually and then the transistor 28 turns off eventually.

A current flowing through the secondary winding 55 of the choke coil 54 reaches a maximum value immediately after the main switching element 4 turns off, and then drops slantingly depending on an inductance of the choke coil 54. In the present embodiment, the voltage induced in the driving winding 54 is fed into the rectifier switching element 6 as a drive signal so quickly as to be the closest possible to the moment that the main switching element 4 turns off, by the operation of the emitter-follower circuit provided in said drive circuit 17, so that a resistance to turn on the rectifier switching element 6 can be made smaller and the efficiency can be improved.

Thereafter, waveforms of a current generated in the secondary winding 13 of the current transformer 11, namely waveforms of a voltage generated across both ends of the resistor 14 drops down slantingly, and the base potential of the transistor 28 becomes low. When the voltage generated in the both ends of the resistor 14 drops to a certain level, the transistor 28 serving as a switching means turns on. Then, the potential at the junction points of the resistors 25 and 26 drops rapidly, so that the transistor 27 is cut off and then the supply of the driving signal to the rectifier switching element 6 is interrupted. At this moment, the charge stored in the gate in the rectifier switching element 6 is discharged rapidly through the diode 24 and the transistor 28. Thus, a timing to interrupt the driving signal to the rectifier switching element is determined by the level of the detection signal, utilizing a slanting fall of the detection signal generated in the secondary winding 13 of the current transformer 11. Accordingly, by allowing the output current to flow into the smoothing capacitor 7 or the load through the rectifier switching elements 6 and 52, a loss by the synchronous rectification can be reduced.

According to this embodiment, there is provided a switching regulator, comprising the main switching element 4, the choke coil 54 for storing or discharging energy, corresponding to the "on" or "off" of the main switching element 4, and the flywheel typed rectifier switching element 6 that turns on when the energy is discharged by the choke coil 54, wherein said switching regulator further comprises: the driving winding 56 wound around the choke coil 54; the current transformer 11 for detecting the current flowing into the rectifier switching element 6; the drive circuit 17 for driving the rectifier switching element which supplies the voltage generated in the driving winding 56 to the rectifier switching element 6 as an "on" signal; and the turn-off circuit 16 for turning off the rectifier switching element by the detection signal generated in the secondary winding 13 of the current transformer 11.

Accordingly, when the main switching element 4 switches from "on" to "off", the voltage is induced in the driving winding 56 by the energy stored in the choke coil 54 until that point. This voltage is supplied from the drive circuit 17 to the rectifier switching element 6 so that it turns on. On the other hand, when an inertial current flowing into the rectifier switching element, with the discharge of energy from the choke coil 54, is detected by the current transformer 11, and the detection signal generated in the secondary winding 13 of the current transformer 11 drops to a certain level, the rectifier switching element 6 turns off. Therefore, by clearly determining the timing of "on" or "off" of the rectifier switching element 6, you can avoid such a useless power loss caused by a reverse current from a light load, for example, allowing an energy to be stored in the choke coil 54 which then returns to the power source side when the main switching element 4 turns on so as to turn on the rectifier diode 10.

Further, by simply winding the driving winding 56 in the existing choke coil 54, the voltage induced in the driving winding 56 can be used as a drive signal of the rectifier switching element 6 and the voltage enough to turn on the rectifier switching element 6 can be fed by merely changing the number of turns of the driving winding 56 in a suitable manner, so that the needs for lower voltage in regulators can be met satisfactorily by a small change in design.

In this case as well, even though a reverse current from other component regulators 9b to 9n attempts to flow into the component regulator 9a passing through the rectifier switching element 6 thereof when the rectifier switching element 6 in the regulator 9a turns on, the rectifier switching element 6 turns off immediately by the aforesaid turn-off circuit 16 so that the harmful influence upon other circuit elements in the regulator 9a can be averted.

Also, as the turn-off circuit 16 is so structured that the rectifier switching element 6 turns off when a forward current flowing in the rectifier switching element 6 reaches a certain level or below, not only the inflow of the reverse current from the above-mentioned other regulators is prevented but also the "off" timing of the rectifier switching element 6 that is synchronized with the "on" or "off" timing of the main switching element 4 can be determined by the common turn-off circuit 16 so that the circuit topology does not need to be complicated.

Still also, as the emitter-follower circuit comprising the resistors 25,26 and the transistor 27 serves as an impedance matching circuit between the auxiliary winding 21 and the rectifier switching element 6, the rectifier switching element 6 builds up more rapidly than that in conventional ones, and thus the efficiency is further improved. Moreover, by the transistor 28 serving as a switching means provided in the drive circuit 17 for driving the rectifier switching element, the electric charge charged in the gate of the rectifier switching element 6 can be discharged to an output side via the transistor 28 when the rectifier switching element 6 turns off.

In addition, in this embodiment, as the turn-off circuit 16 comprises the speed-up circuit 20 which includes a parallel circuit of the capacitor 18 and the resistor 19, connected between the secondary winding 13 of the current transformer 11 and the transistor 28, the switching action of the transistor 28 can be made speedy, by this speed-up circuit 20 so that the electric charge stored in the gate of the rectifier switching element 6 can be discharged to the output side rapidly.

Figure 11:
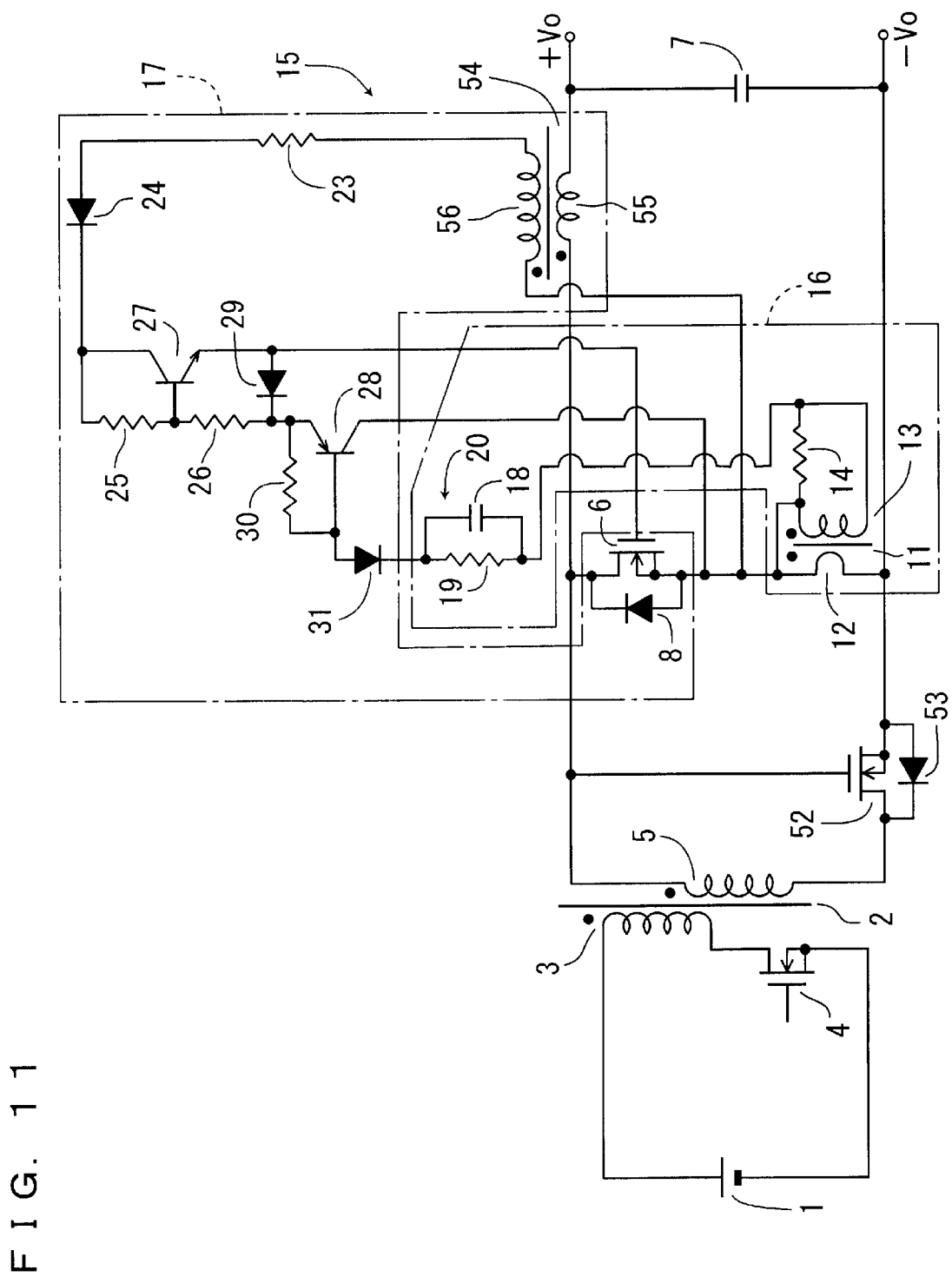
FIG. 11 is a schematic of a regulator according to a seventh embodiment of the present invention.

In FIG. 11 showing a seventh embodiment of the invention, the same portions as those described in the foregoing embodiments will be denoted by the same reference numerals. In this embodiment, the diode 31 that is the same as that in the second embodiment is connected to between the drive circuit 17 and the turn-off circuit 16. The topology of the other parts is in common with the sixth embodiment. In this embodiment as well, like in the second embodiment, the further stabilization of "on/off" operation of the rectifier switching element 6 can be simply attained by providing the diode 31 for interrupting the feeding of a signal from the turn-off circuit 16 to the outside when turning on the rectifier switching element 6.

Figure 12:
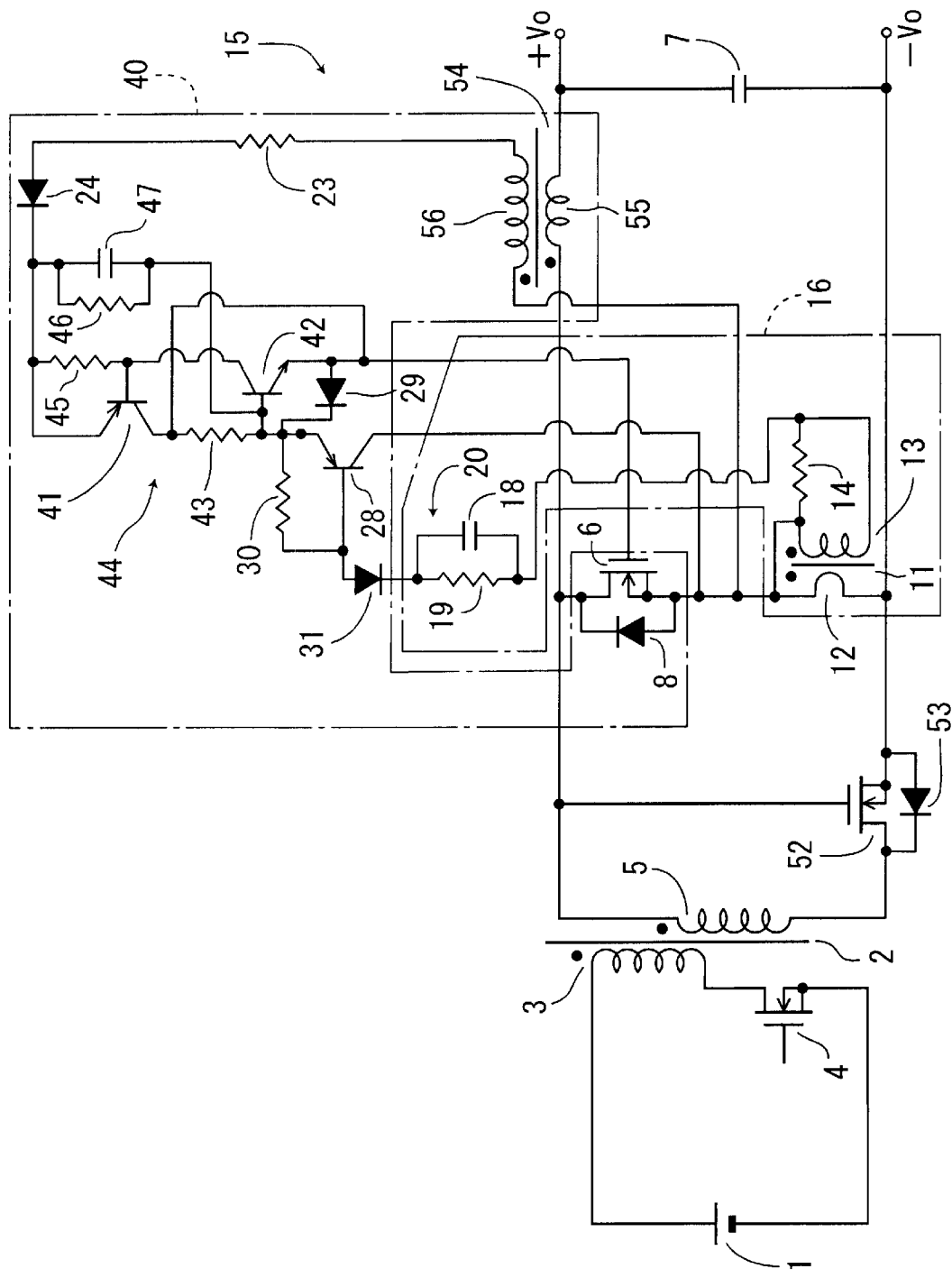
FIG. 12 is a schematic of a regulator according to an eighth embodiment of the present invention.

FIG. 12 shows an eighth embodiment of this invention, in which the same portions as those described in the foregoing embodiments will be denoted by the same reference numerals. According to this embodiment, the circuit topology shown in FIG. 11 comprises a drive circuit 40 for driving the rectifier switching element, which is provided with a thyristor circuit 44 that is the same as that in the third embodiment. The topology of the other parts is the same as the seventh embodiment shown in FIG. 11.

In the thyristor circuit 44 of the embodiment as well, the gate potential of the rectifier switching element 6 is kept as it is so that it takes an approximately square waveform, when a voltage is induced in the drive winding 21 and the voltage is once fed to the gate of the rectifying switching element 6 as a driving voltage. Accordingly, the ON-state resistance of the rectifying switching element 6 is kept small so that the regulator efficiency can be improved further. It should be noted that the component elements in the thyristor circuit 44 should not be limited to those used in the embodiment.

Figure 13:
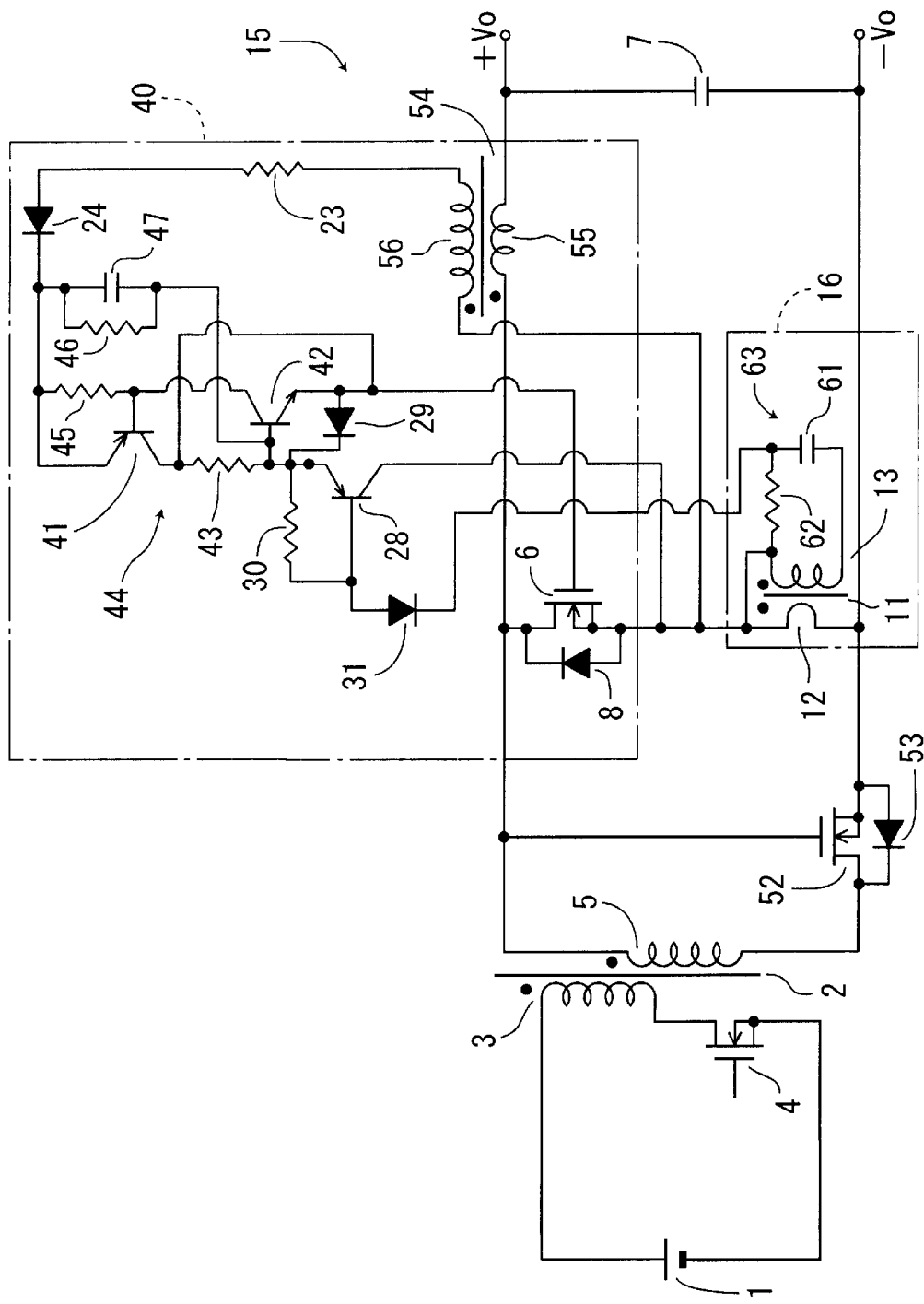
FIG. 13 is a schematic of a regulator according to a ninth embodiment of the present invention.

FIG.13 shows a ninth embodiment of this invention, in which the same portions as those described in the foregoing embodiments will be denoted by the same reference numerals. In the embodiment, instead of the resistor 15 in the circuit of FIG. 12 is provided the differential circuit 63 comprising the capacitor 61 and the resistor 62, connected across the secondary winding 13 of the current transformer 11, said differential circuit 63 differentiating a detection signal induced in the secondary winding 13 of the current transformer 11. Likewise, the topology of the other parts than those described above is the same as the foregoing eighth embodiment.

In this embodiment, positive and negative trigger signals are generated at both terminals of the resistor 62, corresponding to a building-up or building-down of the current generated in the secondary winding 13 of the current transformer 11. Accordingly, if the rectifier switching element 6 is turned off when a negative trigger signal is generated, the "on/off" operation of the rectifier switching element 6 can be stabilized further. In the meantime, the circuit elements in the differential circuit 63 should not be limited to those described in the ninth embodiment.

Figure 14:
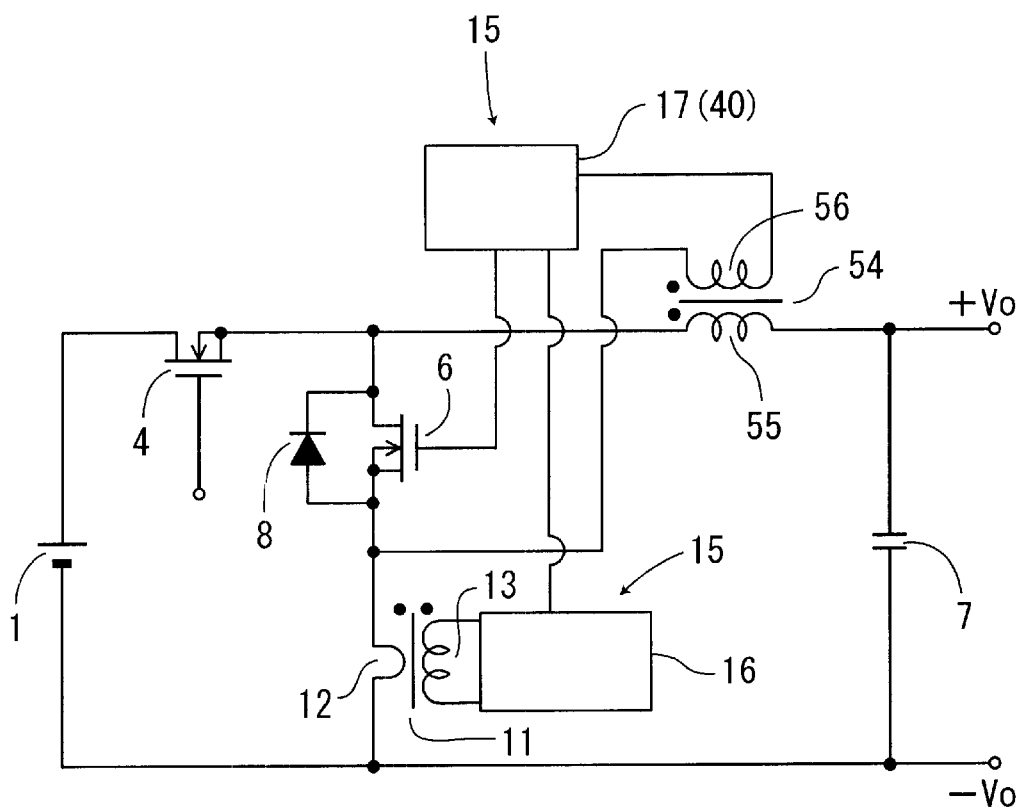
FIG. 14 is a schematic of a regulator according to a tenth embodiment of the present invention.

FIG. 14 shows a tenth embodiment of this invention in which the same portions as those described in the foregoing embodiments will be denoted by the same reference numerals. The tenth embodiment shows a case where the invention is applied to a switching regulator comprising an non-insulated descent voltage typed DC/DC converter. More specifically, a series circuit of the main switching element 4 and the direct current power source 1 is connected directly to both terminals of a series circuit of the rectifier switching element 6 and the primary winding 12 of the current transformer 11. The topology of the other parts is same as the above-mentioned sixth embodiment.

In this case also, when the main switching element 4 turns on, energy is fed to the smoothing capacitor 7 and a load (not shown in the drawing) connected to the output terminals of +Vo and −Vo via the choke coil 54 from the direct current power source 1. On the other hand, a voltage induced in the driving winding 56 is supplied to gate of the rectifier switching element 6 as an "on" signal when the main switching element 4 turns on, so that the rectifier switching element 6 turns on and then energy stored in the choke coil 54 is supplied to the smoothing capacitor 7 and the load, so that an current flows in the circuit through the primary winding 12 of the current transformer and the rectifier switching element 6. After that, as a detection current in the secondary winding 13 of the current transformer 11 falls gradually, the rectifier switching element 6 turns off by the turn-off circuit 16.

In this case as well, even though a reverse current from other component regulators 9b to 9n attempts to flow into the component regulator 9a passing through the rectifier switching element 6 thereof when the rectifier switching element 6 in the regulator 9a turns on, the rectifier switching element 6 turns off immediately by the aforesaid turn-off circuit 16 so that the harmful influence upon other circuit elements in the regulator 9a can be averted.

In this case as well, like the above-mentioned respective embodiments, it is possible to meet the needs for a lower voltage in regulators, by supplying the voltage from the driving winding 56 to the rectifier switching element as a driving signal. Also, by the synchronous rectification from the rectifier switching element 6, a power loss can be reduced more than conventional rectification by diode.

In the meantime, the invention should not be limited to the above-mentioned embodiments, but various modifications of the invention are possible within the scope of the invention, and thus it can apply to various types of switching regulators. For example, an external diode may be connected instead of the body diodes 8 and 53.

What is claimed is:

1. A switching power supply including a rectifying switching element used as a rectifier element, connected to a secondary winding of a transformer, which comprises a synchronous rectifier circuit, comprising:

a current transformer for detecting current flowing through said rectifying switching element;

an auxiliary winding, wound in said transformer, said auxiliary winding having a lower impedance than that of said current transformer;

a drive circuit for feeding a voltage generated in said auxiliary winding to said rectifying switching element as an "on" signal to build up sharply the rectifying switching element; and a turn-off circuit for turning off said rectifying switching element before the current flowing through said rectifying switching element turns reverse by a detection signal generated in a secondary winding of said current transformer.

2. A switching power supply according to claim 1, further comprising an unidirectionally conductible element which interrupts an output of a signal from said turn-off circuit to said drive circuit when said rectifying switching element is on, while said unidirectionally conductible element conducts to turn off said switching element when a detection signal induced in a secondary winding of said current transformer drops.

3. A switching power supply according to claim 1, wherein said drive circuit comprises an emitter-follower circuit connected to a path between said auxiliary winding and said rectifying switching element.

4. A switching power supply according to claim 1, wherein said drive circuit comprises a thyristor circuit connected to a path between said auxiliary winding and said rectifying switching element.

5. A switching power supply according to claim 1, wherein said turn-off circuit comprises a differential circuit connected across a secondary winding of said current transformer.

6. A switching power supply according to claim 1, wherein said drive circuit comprises a switching means which turns on when the level of detection signal generated in the secondary winding of said current transformer drops and then discharges electric charge stored in the gate of said rectifying switching element to an output side.

7. A switching power supply according to claim 6, wherein said turn-off circuit is connected to a speed-up circuit comprising a parallel circuit of a resistor and a capacitor connected to a path between the secondary winding of said current transformer and said switching means.

8. A switching power supply according to claim 1, which comprises a plurality of switching component regulators performing a parallel-running, each component regulator being provided with said synchronous rectifier circuit.

9. A switching power supply according to claim 8, wherein said turn-off circuit is so composed that said rectifying switching element may be turned off when a forward current flowing through said rectifying switching element drops to a predetermined level or below.

10. A switching power supply having a main switching element, a choke coil charging or discharging energy corresponding to on or off of the main switching element and a rectifying switching element which turns on when said choke coil discharges energy, wherein said switching regulator comprises a synchronous rectifier circuit comprising:

a drive winding wound in said choke coil;

a current transformer detecting current flowing through said rectifying switching element; a drive circuit which feeds a voltage induced in said drive winding to said rectifying switching element as an "on" signal when said choke coil discharges energy to thereby build up the rectifying switching element; and a turn-off circuit which turns off said rectifying switching element by a detection signal induced in the secondary winding of said current transformer.

11. A switching power supply according to claim 10, further comprising an unidirectionally conductible element which interrupts an output of a signal from said turn-off circuit to said drive circuit when said switching element is on, while said unidirectionally conductible element conducts to turn off said switching element when a detection signal induced in the secondary winding of said current transformer drops.

12. A switching power supply according to claim 10, wherein said drive circuit comprises an emitter-follower circuit connected to a path between said drive winding and said rectifying switching element.

13. A switching power supply according to claim 10, wherein said drive circuit comprises an thyristor circuit connected to a path between said drive winding and said rectifying switching element.

14. A switching power supply according to claim 10, wherein said turn-off circuit comprises a differential circuit connected across the secondary winding of said current transformer.

15. A switching power supply according to claim 10, wherein said drive circuit comprises a switching means which turns on when the level of a detection signal generated in the secondary winding of said current transformer drops, and then discharges electric charge, stored in the gate of said rectifying switching element, to an output side.

16. A switching power supply according to claim 15, wherein said turn-off circuit comprises a speed-up circuit comprising a parallel circuit of a resistor and a capacitor connected to a path between the secondary winding of said current transformer and said switching means.

17. A switching power supply according to claim 10, which comprises a plurality of switching component regulators performing a parallel-running, each component regulator being provided with said synchronous rectifier circuit.

18. A switching power supply according to claim 17, wherein said turn-off circuit is so composed that said rectifying switching element may be turned off when a forward current flowing through said rectifying switching element drops to a predetermined level or below.

* * * * *